Patented Sept. 28, 1943

2,330,324

UNITED STATES PATENT OFFICE 2,330,324

FINING OF GLASS

Frederick W. Adams, Pittsburgh, Pa., assignor to Pittsburgh Plate Glass Company, Allegheny County, Pa., a corporation of Pennsylvania No Drawing. Application February 25, 1942, Serial No. 432,269

1 Claim. (Cl. 49—77)

The present invention relates to the treatment of glass for purposes of removing water vapors and other gases therefrom.

An object of the invention is to provide a glass which is substantially free of gas bubbles, such as may be occasioned by carbon dioxide, air and water vapors, which glass is also substantially clear or at least free from objectionable tints.

It has heretofore been recognized that in the formation of glass by melting together such ingredients as silica, lime, soda-ash and salt cake, large volumes of gas, such as carbon dioxide and sulphur dioxide are evolved. There are also present in the glass batch other gases, such as air and water vapors. Most of these gases escape during melting and subsequent fining operations, but a few of them become entrapped as minute bubbles in the viscous melt and are very difficult to eliminate. Heretofore it has been customary to subject the glass to so-called "blocking" operations in which organic matter, such as blocks of wood, potatoes or the like are thrown into the melt and there quickly evolve large volumes of gases, which form bubbles of such size that they quickly make their way to the surface and escape, at the same time carrying away with them many of the smaller bubbles called "seed" which would otherwise be permanently retained. This type of treatment is not particularly effective in the removal of water vapors, possibly because the latter are actually absorbed in the glass, but when the melt is formed into bodies and allowed partially to cool the vapors seem to escape to form seed.

In my prior patent, No. 2,274,643, issuing as of the date of March 3, 1942, and copending herewith, it is proposed to eliminate water vapors and other gaseous substances from a glass melt by first bubbling through the melt carbon monoxide at appropriate rate. This treatment effectively removes the gas bubbles including even the difficulty removable water vapors. However, if the treatment is long continued the glass tends to assume a brownish tint which increases in intensity as the treatment is continued. As disclosed in my patent the brown discoloration can be eliminated by blowing oxygen or oxygen-containing gas through the melt. This treatment however is not always entirely satisfactory, because the treatment with oxygen tends to produce a bluish tint in the glass, which sometimes is objectionable.

In accordance with the provisions of the present invention, it is proposed to obviate the foregoing difficulties by subjecting only a portion of the melt, which has been treated with carbon monoxide, to oxidation. Subsequently the two portions of the melt, one of which has been treated with carbon monoxide and then with an oxidizing gas, the other of which has been treated only with carbon monoxide are mixed together. As a result of the admixture of the two portions, a melt is obtained which is free of seed and is also substantially clear, or is of such tint as may be desired. The term "melt" as employed herein connotes molten glass in a single receptacle, such as a pot or tank, or in a plurality of such pots or tanks. Therefore, "portions," for treatment by the process herein disclosed, may be taken from a single receptacle or from a plurality of receptacles, which portions are then blended.

In practice of the invention a portion of a melt is treated in accordance with the provisions of my foregoing invention, first with carbon monoxide if desired, in the apparatus disclosed in my patent until all or substantially all of the gases that tend to form bubbles are removed. The temperatures of treatment may be approximately within the range of 2000 to 2700° F., depending somewhat upon the melting temperature of the glass. The rate of flow may be comparatively slow, but should be continued for a considerable period of time, for example, about 1 or 2 hours. This period may be extended to 4 or 5 hours, if desired. As a result of this treatment the glass is freed of seed bubbles of gases and vapors, but is distinctly discolored. That is it assumes objectionable brownish color. A portion or all of the discolored glass is then treated preferably at about the same temperature with oxidizing gas, such as air or oxygen until it has lost its brownish discoloration and has assumed a distinct bluish cast. A portion of the brownish tinted glass is then admixed with a portion of the bluish tinted glass, the ratio of the two portions being such that the coloration of a resultant mixture is substantially lost or at least is reduced to a desired degree. These preparations of course will depend upon the intensity of the discoloration of the components of the mixture. It is impossible to define the proportions quantitatively, but in each instance it is an easy matter to determine when the necessary admixture is reached by observation of the color of the mixture. Mixing of the two glasses in molten state should be as thorough as possible, in order to obviate streaks in the finished product, which are formed from the glass. This mixing may be performed in a pot, tank or the like equipped with a mechanical agitator.

The form of the invention disclosed herein is to be regarded merely as exemplary. It will be apparent to those skilled in the art that numerous modifications may be made therein without departure from the spirit of the invention or the scope of the appended claim.

What I claim is:

A process of forming substantially clear glass having a very low content of bubbles of gaseous material, such as water vapor, carbon dioxide, sulphur dioxide and the like, which process comprises first bubbling carbon monoxide through molten glass containing the gaseous substances as "seed" until most of the gases, including the water vapor, are removed, then bubbling an oxidizing gas through a portion of the glass, then admixing the latter portion of glass with the portion which has not been treated with the oxidizing gas.

FREDERICK W. ADAMS.